United States Patent [19]
Yasoshima et al.

[11] Patent Number: 5,996,069
[45] Date of Patent: *Nov. 30, 1999

[54] METHOD AND CIRCUIT FOR DELAYED BRANCH CONTROL AND METHOD AND CIRCUIT FOR CONDITIONAL-FLAG REWRITING CONTROL

[75] Inventors: Hiroyuki Yasoshima, Menlo Park, Calif.; Hideyuki Kabuo, Osaka, Japan

[73] Assignee: Matsushita Electric Industrial Co., Ltd., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/865,160

[22] Filed: May 29, 1997

[30] Foreign Application Priority Data

May 30, 1996 [JP] Japan ................................. 8-136212

[51] Int. Cl.⁶ ..................................................... G06F 9/38

[52] U.S. Cl. .............................................. 712/234

[58] Field of Search .................................. 395/581, 584, 395/585, 586, 587, 706; 712/234, 237, 238, 239, 240

[56] References Cited

U.S. PATENT DOCUMENTS

| | | | |
|---|---|---|---|
| 5,471,593 | 11/1995 | Branigin . | |
| 5,509,130 | 4/1996 | Trauben et al. | 395/391 |
| 5,655,097 | 8/1997 | Witt et al. | 395/380 |
| 5,706,459 | 1/1998 | Atsushi | 395/376 |
| 5,706,490 | 1/1998 | Beard et al. | 395/581 |
| 5,784,603 | 7/1998 | Leung et al. | 395/581 |

FOREIGN PATENT DOCUMENTS 3-122718   5/1991   Japan .
4-127237   4/1992   Japan .

OTHER PUBLICATIONS

Patent Abstracts of Japan, vol. 11, No. 378 (P–645), Dec. 10, 1987 and JP 62–147530 A (Hitachi Ltd.) Jul. 1, 1987.

J. Cortadella et al: "Designing a Branch Target Buffer for Executing Branches with Zero Time Cost in a Risc Processor" Microprocessing & Microprogramming, vol. 24, No. 1–5, Aug. 1988, pp. 573–580, XP000038090.

A.M. Gonzalez: "A survey of branch techniques in pipelined processors" Microporcessing & Microprogramming, vol. 36, No. 5, Oct. 1993, pp. 243–257, XP000397907.

M. J. Mahon et al: "Hewlett–Packard Precision Architecture: The Processor" Hewlett–Packard Journal, vol. 37, No. 8, Aug. 1986, pp. 4–21, XP000211314.

G.B. Steven, et al., "ALU design and processor branch architecture" Microprocessing and Microprogramming, vol. 36, No. 5, Oct. 1993, Amsterdam, NL, pp. 259–278.

J.A. Derosa, et al., "An Evaluation of Branch Architectures" Proceedings of the 14th Annual International Symposium O Computer Architecture, Jun. 2–5, 1987, Pittsburgh, PA, US, pp. 10–16.

Primary Examiner—William M. Treat
Attorney, Agent, or Firm—McDermott, Will & Emery

[57] ABSTRACT

In a processor employing a delayed branch method, delayed branch control which does not complicate instruction execution sequence and improves the readability of a program on the assembler level is implemented without providing a control bit in an instruction code. The delayed branch control according to the present invention involves the use of a branch-information storing circuit for storing the occurrence or nonoccurrence of a branch in a specified one of a continuous sequence of cycles immediately before a current execute cycle which are equal in number to delay slots in the processor. In executing a delayed branch instruction, when the branch-information storing circuit stores the occurrence of a branch in the specified cycle, a branch is disabled. This prevents instruction execution sequence from being complicated even when individual branch conditions for consecutive delayed branch instructions are satisfied, so that the program on the assembler level is improved in readability. The branch-information storing circuit can simply be composed of a combination of a shift register, a counter, and a latch.

6 Claims, 11 Drawing Sheets

| INSTRUCTION | REWRITING OF CONDITIONAL FLAG SF | CONDITIONAL-FLAG LOCK REGISTER 21 |
|---|---|---|
| CMP | ○ | SET |
| ADD | × ⎤ LOCKED | — |
| ADD | × ⎦ | — |
| BR | — | CLEAR |
| ADD | ○ | — |
| CMP | ○ | SET |
| ⋮ | | ⋮ |

TIME

| ADDRESS | INSTRUCTION |
|---------|-------------|
| 1 0 0 | br 2 0 0 (CONDITIONAL BRANCH TO 200) |
| 1 0 1 | br 4 0 0 (CONDITIONAL BRANCH TO 400) |

| ADDRESS | INSTRUCTION | CONDITIONAL BRANCH | | | |
|---|---|---|---|---|---|
| 1 0 0 | br 2 0 0 | SATISFIED | SATISFIED | UN SATISFIED | UN SATISFIED |
| 1 0 1 | br 4 0 0 | SATISFIED | UN SATISFIED | SATISFIED | UN SATISFIED |
| ADDRESS TO BE EXECUTED | | 1 0 0<br>1 0 1<br>2 0 0<br>4 0 0<br>4 0 1<br>4 0 2<br>⋮ | 1 0 0<br>1 0 1<br>2 0 0<br>2 0 1<br>2 0 2<br>2 0 3<br>⋮ | 1 0 0<br>1 0 1<br>1 0 2<br>4 0 0<br>4 0 1<br>4 0 2<br>⋮ | 1 0 0<br>1 0 1<br>1 0 2<br>1 0 3<br>1 0 4<br>1 0 5<br>⋮ |

Fig. 14

| ADDRESS | INSTRUCTION | CONDITIONAL BRANCH | | | |
|---|---|---|---|---|---|
| 1 0 0 | br 2 0 0 | SATISFIED | SATISFIED | UN SATISFIED | UN SATISFIED |
| 1 0 1 | br 4 0 0 | SATISFIED | UN SATISFIED | SATISFIED | UN SATISFIED |
| ADDRESS TO BE EXECUTED | | 1 0 0<br>＊＊＊<br>2 0 0<br>2 0 1<br>2 0 2<br>2 0 3<br>⋮ | 1 0 0<br>＊＊＊<br>2 0 0<br>2 0 1<br>2 0 2<br>2 0 3<br>⋮ | 1 0 0<br>1 0 1<br>＊＊＊<br>4 0 0<br>4 0 1<br>4 0 2<br>⋮ | 1 0 0<br>1 0 1<br>1 0 2<br>1 0 3<br>1 0 4<br>1 0 5<br>⋮ |

METHOD AND CIRCUIT FOR DELAYED BRANCH CONTROL AND METHOD AND CIRCUIT FOR CONDITIONAL-FLAG REWRITING CONTROL

BACKGROUND OF THE INVENTION

The present invention relates to control of a branch operation in a processor. More particularly, it relates to control of a delayed branch operation in a processor employing a delayed branch method and to control of the rewriting of a conditional flag to be referenced by a conditional branch instruction.

In so-called pipeline processing whereby instructions are executed in a pipelining manner, a method termed delayed branch has conventionally been used. By way of example, a consideration will be given to the case shown in FIG. 10, wherein instructions are executed by pipeline processing consisting of three stages of instruction fetch (F), instruction decode (D), and instruction execute (E). According to the pipeline processing shown in FIG. 10, the decoding of a branch instruction is followed by the fetching of an instruction at the branch destination. What results is a blank slot (delay slot) for at least one stage. The number of the resulting blank slots is given by the number of stages other than the fetch and execute stages in the pipeline processing.

Delayed branch is a method of eliminating a useless blank slot by inserting, in the delay slot, an instruction residing at an address subsequent to a branch instruction. By using the method, improved performance is expected of a processor (see Japanese Laid-Open Patent Publication HEI 4-127237 and Japanese Laid-Open Patent Publication HEI 3-122718).

A conditional branch instruction determines whether or not a branch is implemented based on a conditional flag reflecting the result of executing an operate instruction, a transfer instruction, or the like. There has been a conventional method wherein the flexibility with which instruction execution sequence is determined is increased by controlling the rewriting of a conditional flag. In a RISC processor SPARC, e.g., one control bit for determining whether or not a conditional flag is rewritten is provided in the code of an operate instruction. When the value of the control bit is "1", the result of the operation is reflected in the conditional flag. When the value of the control bit is "0", the conditional flag is not rewritten (see "SPARK Architecture Manual," Sun Microsystems Inc., 1991). The method permits the determination of whether or not the conditional flag is rewritten for each instruction, so that the flexibility with which instruction execution sequence is determined in a compiler or the like is increased.

However, the conventional method has the following problems.

First, in the delayed branch method as mentioned, instruction execution sequence is complicated when a sequence of delayed branch instructions are given consecutively.

FIG. 11 shows an example of a program on the assembler level when a sequence of delayed branch instructions are given consecutively. A first delayed branch instruction br200 (specifying a branch to an address 400 when a condition is satisfied) resides at an address 100. A second delayed branch instruction br400 (specifying a branch to an address 400 when a condition is satisfied) resides at an address 101. FIG. 12 shows a relationship between the occurrence or nonoccurrence of a branch specified by each of the delayed branch instructions and instruction execution sequence in executing the program shown in FIG. 11. The operation of the program shown in FIG. 11 is divided into the two cases where a branch is caused or not caused by the first delayed branch instruction br200 and then further divided into the two cases where a branch is caused or not cause by the second delayed branch instruction br400. As a result, the total of four cases should be considered, as shown in FIG. 12.

In the case where the condition for each of the first and second delayed branch instructions br200 and br400 is satisfied and branches occur, the instruction at the address 200 is fetched because the branch condition for the first delayed branch instruction br200 is satisfied (the instruction at the address 200 is designated at (200)) and then the instruction at the address 400 is fetched because the branch condition for the second delayed branch instruction br400 is satisfied (the instruction at the address 400 is designated at (400)), as shown in FIG. 13. Consequently, the processor performs a complicated operation of jumping to the destination (address 200) of the branch caused by the first delayed branch instruction br200 to execute only one instruction and then further jumping to the destination (address 400) of the branch caused by the second delayed branch instruction br400 to execute an instruction, as shown in FIG. 12.

This seriously impairs the readability of the program on the assembler level, causing a bug in the program.

In particular, an unskilled programmer who does not have full understanding of delayed branch would produce a program without expecting such an operation, so that the program inevitably suffers from a bug. In addition, since the bug is recognized only when individual conditions for consecutive delayed branch instructions are satisfied to cause branches, previous debugging is extremely difficult. Oftentimes, the bug cannot be discovered until the apparatus is activated.

A skilled programmer who has better knowledge of delayed branch would make a proper modification to the program by inserting a no-operate (NOP) instruction between the consecutive delayed branch instructions with a view to avoiding the problem. However, since the modification is troublesome, it is forgotten many a time. Moreover, if the processor has an increased number of delay slots, it is necessary to insert as many no-operate instructions as the delay slots, so that the program becomes redundant and the memory capacity for storing the program is increased accordingly.

The problem may arise even when the delayed branch instructions are not consecutively given but they are relatively close in sequence in the program. Although FIGS. 12 and 13 are based on the assumption that the number of delay slots in the processor is 1, a similar problem occurs when the processor has a larger number of delay slots and the spacing between inconsecutive delayed branch instructions is small relative to the number of delay slots in the processor, which complicates the sequence in which the instructions are executed when individual branch conditions for the instructions are satisfied.

There is another type of processor wherein a control bit for determining whether or not a delayed branch is implemented is provided in the code of a delayed branch instruction (see Japanese Laid-Open Patent Publication HEI 4-127237). If the control bit is 0, the processor does not execute an instruction placed in a delay slot when a branch is enabled. FIG. 14 shows a relationship between the occurrence or nonoccurrence of a branch specified by each of delayed branch instructions and instruction execution sequence when the program shown in FIG. 11 is executed by the processor of this type. In FIG. 14, "*" indicates that the instruction placed in the delay slot is not executed. In this case, if the control bit for the first delayed branch instruction br200 is set to 0, the first delayed branch instruction br200 determines whether or not a branch to the address 200 is implemented and the second delayed branch instruction br400** is executed only when no branch occurs, so that the readability of the program on the assembler level is not impaired.

However, the provision of the control bit for determining the occurrence or nonoccurrence of a delayed branch in the instruction code increases the bit width of the instruction code by 1 bit, so that the memory capacity for storing the program is increased disadvantageously. In particular, an increased memory capacity forms a fatal drawback to a portable telecommunication device in terms of device size, power consumption, manufacturing cost, and the like. Moreover, the processor requires an additional circuit for controlling delayed branch based on the control bit in the delayed branch instruction code, which is to be provided in the instruction decoder of the processor.

Furthermore, in the case where the bit width of the instruction code is preliminarily determined by specifications, the provision of even one control bit adds constraints to device design. If the instruction code is composed of 24 bits, e.g., at most only several bits other than the bits required to represent an instruction type, a specified address, and the like can be used for design. As a result, even one control bit may significantly reduce design flexibility.

A similar problem also occurs in the conventional method of controlling the rewriting of a conditional flag. The provision of a control bit for the rewriting of the conditional flag causes the problem of an increased memory capacity for storing a program, the problem that the instruction decoder requires an additional internal circuit for controlling the rewriting of the conditional flag based on the control bit in an instruction code, and the problem of reduced flexibility with which device design is conducted.

SUMMARY OF THE INVENTION

The present invention has been achieved to implement delayed branch control in a processor employing a delayed branch method, wherein instruction execution sequence is not complicated and the readability of a program on the assembler level is improved without providing a control bit in an instruction code.

The present invention also provides a method of controlling the rewriting of a conditional flag without providing a control bit in an instruction code.

Specifically, the present invention provides a method of controlling a delayed branch operation in a processor employing a delayed branch method. In executing a delayed branch instruction, when a branch has occurred in a specified one or ones of a continuous sequence of cycles immediately before an execute cycle for the delayed branch instruction which are equal in number to delay slots in the processor, the branch specified by the delayed branch instruction is disabled.

In accordance with the method, even if the branch condition for the delayed branch instruction is satisfied, the branch is disabled when a branch has occurred in the specified cycle previous to the execute cycle for the delayed branch instruction, so that the branch is not implemented. Consequently, instruction execution sequence is not complicated even in the case where individual branch conditions are satisfied for delayed branch instructions close to each other relative to the number of delay slots in the processor, which improves the readability of the program on the assembler level.

The present invention also provides, as a circuit implementing the delayed branch control method, a delayed branch control circuit provided in a processor employing a delayed branch method to control a branch operation, the circuit comprising: a branch-information storing circuit for storing information indicating whether or not a branch has occurred in a specified one or ones of a continuous sequence of cycles immediately before a current execute cycle which are equal in number to the number of delay slots in the processor; and a branch judging circuit for directing, in executing the delayed branch instruction, the processor to implement a branch only when a branch condition for the delayed branch instruction is satisfied and the branch-information storing circuit stores information indicating that no branch has been implemented in the specified cycle or cycles.

Preferably, the branch-information storing circuit comprises a shift register composed of flip-flops connected in series which are equal in number to the delay slots in the processor, the shift register receiving an output signal from the branch judging circuit and shifting a signal held thereby every time an instruction is executed in the processor.

With the arrangement, the signal held by each flip-flip of the shift register indicates the occurrence or nonoccurrence of a branch in each of the continuous sequence of cycles immediately before the current execute cycle which are equal in number to the delay slots in the processor. Hence, the branch-information storing circuit can be composed of a simple structure.

Preferably, the branch-information storing circuit comprises: a counter for initiating counting of the number of instructions executed by the processor when the branch judging circuit directs the processor to implement a branch and completing the counting when the number of count reaches the number of the delay slots in the processor; and a latch circuit for clearing an output signal therefrom when the branch judging circuit directs the processor to implement a branch and setting the output signal when the counter completes the counting.

With the arrangement, the output signal from the latch is cleared during the period after the branch judging circuit directed the processor to implement a branch until the instructions equal in number to the delay slots in the processor are executed. In other words, the output signal from the latch is cleared when a branch has occurred in any one of the continuous sequence of cycles immediately before the current execution cycle which are equal in number to the delay slots in the processor, while it is set when no branch has occurred. Hence, the branch-information storing circuit can be composed of a simple structure.

The present invention also provides a method of controlling the rewriting of a conditional flag in a processor, wherein it is determined whether the processor enables or disables the rewriting of the conditional flag based on the order of instructions in a program.

In accordance with the method, it is determined whether the rewriting of the conditional flag is enabled or disabled based on instruction sequence in the program. When control of the rewriting of the conditional flag can be formulated based on instruction sequence in the program, therefore, it is unnecessary to provide the bit for controlling the rewriting of the conditional flag in the instruction code.

The present invention also provides a circuit implementing the conditional-flag rewriting control method, which comprises: a conditional-flag lock circuit for setting an output signal therefrom when a compare instruction has been executed and clearing the output signal when a conditional branch instruction has been executed; and a rewriting judging circuit for disabling the rewriting of the conditional flag when the output signal from the conditional-flag lock circuit is set in executing an operate instruction.

The arrangement implements control under which the operate instruction between the compare instruction and the conditional branch instruction does not rewrite the conditional flag without providing the bit for controlling the rewriting of the it conditional flag in the operate instruction code.

The present invention also provides a circuit implementing the conditional-flag rewriting control method based on the premise that the processor decodes and executes an instruction by pipeline processing, which comprises: a logic circuit for disabling the rewriting of the conditional flag when an instruction in an execute stage is an operate instruction and an instruction in a decode stage specifies the rewriting of the conditional flag.

The arrangement implements control under which the operate instruction followed by the instruction specifying the rewriting of the conditional flag does not rewrite the conditional flag without providing the bit for controlling the rewriting of the conditional flag in the operate instruction code.

The present invention also provides a circuit implementing the conditional-flag rewriting control method based on the premise that the processor decodes and executes an instruction by pipeline processing, which comprises a logic circuit for enabling, when an instruction in an execute stage is an operate instruction, the rewriting of the conditional flag only when an instruction in a decode stage is a conditional branch instruction.

The arrangement implements control under which the operate instruction rewrites the conditional flag only when it is followed by the conditional branch instruction without providing the bit for controlling the rewriting of the conditional flag in the operate instruction code.

BRIEF DESCRIPTION OF THE DRAWINGS

FIGS. 4 show a conditional-flag rewriting control circuit according to the embodiment of the present invention, of which

FIGS. 5 show another example of the conditional-flag rewriting control circuit according to the embodiment of the present invention, of which

FIGS. 6 show still another example of the conditional-flag rewriting control circuit according the embodiment of the present invention, of which

FIG. 11 is executed;

FIG. 14 shows a relationship between the occurrence or nonoccurrence of a branch in each of the delayed branch instructions and instruction execution sequence when the program shown in FIG. 11 is executed by a type of processor executing an instruction code provided with a delayed branch control bit.

DETAILED DESCRIPTION OF THE INVENTION

A description will be given first to the principle of delayed branch control according to the present invention.

As described previously in "BACKGROUND OF THE INVENTION," a processor employing a delayed branch method performs such a complicated operation as to seriously impair the readability of a program on the assembler level only when individual branch conditions for consecutive delayed branch instructions are satisfied. If the branch conditions are unsatisfied, the operation caused by the delayed branch instructions is the same as caused by a NOP (Non-Operate) instruction, which is comparable to substantially no execution.

When the individual branch conditions for the delayed branch instructions are satisfied, therefore, the operation of seriously impairing the readability of the program on the assembler level can be prevented under such control that the branch condition for the delayed branch instruction placed in a delay slot is constantly unsatisfied.

Figure 1:
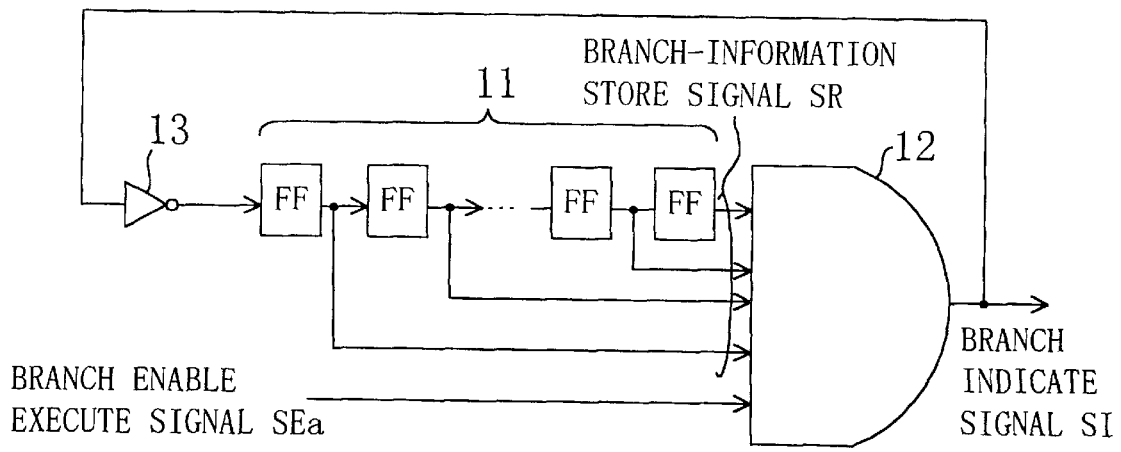
FIG. 1 shows the structure of a delayed branch control circuit according to an embodiment of the present invention.

FIG. 1 shows the structure of a delayed branch control circuit according to an embodiment of the present invention, which has been implemented based on the principle. In the drawing are shown: a shift register 11 as a branch-information storing circuit; an AND gate 12 as a branch judging circuit outputting a branch indicate signal SI; an inverter 13 for inverting the branch indicate signal SI outputted from the AND gate 12 and inputting the obtained signal to the shift register 11.

The shift register 11 consists of flip-flops equal in number to delay slots in a processor. In every cycle or every time an instruction is executed by the processor, the shift register 11 receives the branch indicate signal SI inverted by the inverter 13, while shifting the signal held thereby. In short, the shift register 11 stores information indicating the occurrence or nonoccurrence of a branch in each of a continuous sequence of cycles immediately before the current execute cycle which are equal in number to the delay slots in the processor and inputs the stored information as a branch-information store signal SR to the AND gate 12.

The AND gate 12 outputs the branch indicate signal SI only when it receives a branch execute signal SEa because of the satisfied branch condition for the branch instruction and the branch-information store signal SR received from the shift register 11 indicates that no branch has occurred previously.

Thus, the delayed branch control circuit shown in FIG. 1 stores, in the shift register 11, information indicating a previous branch caused or not caused by a branch instruction in each of the continuous sequence of cycles immediately before the current execute cycle which are equal in number to the delay slots in the processor and unconditionally disables a branch as long as the shift register 11 stores the occurrence of a previous branch.

Figure 2:
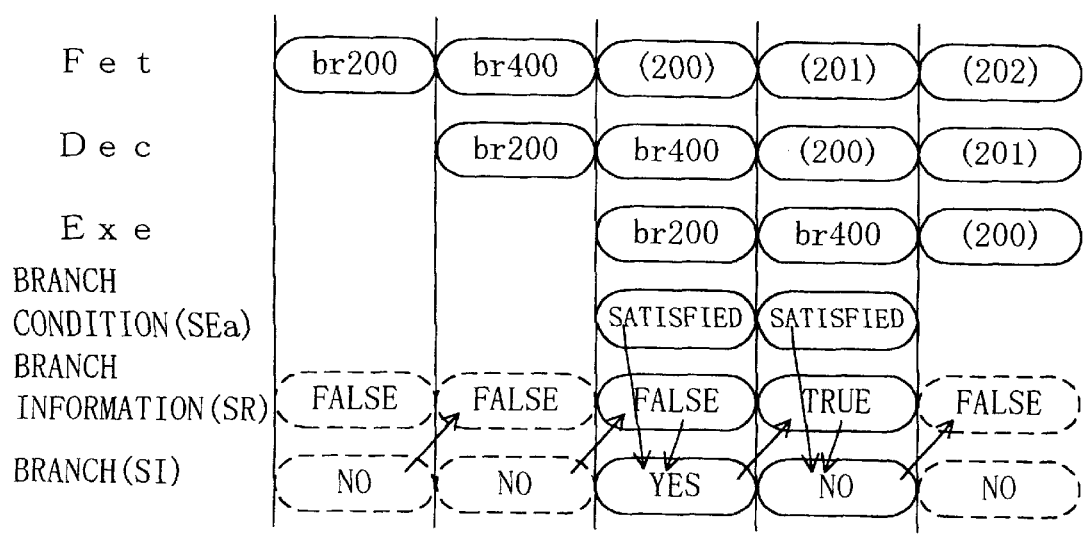
FIG. 2 illustrates the operation of the delayed branch control circuit according to the embodiment of the present invention shown in FIG. 1.
Figures 10, 11:
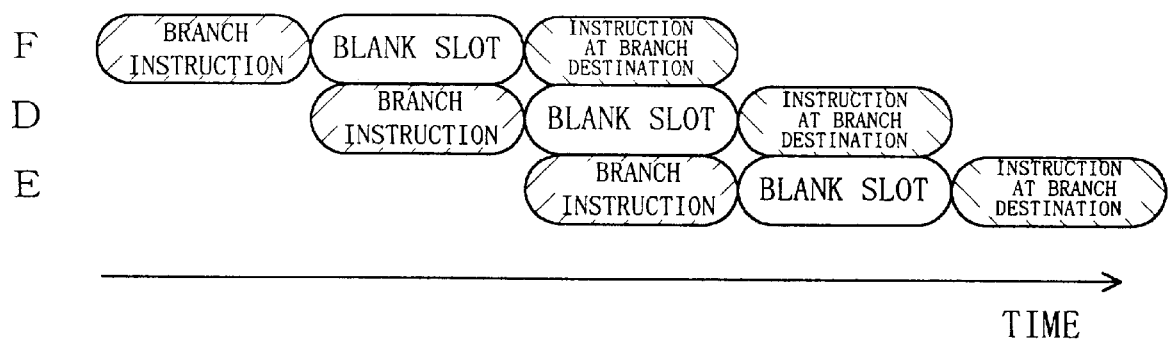
FIG. 10 shows the flow of pipeline processing during the execution of a branch instruction.
FIG. 11 shows an example of a program on the assembler level who delayed branch instructions are consecutively given.
Figures 12, 13:
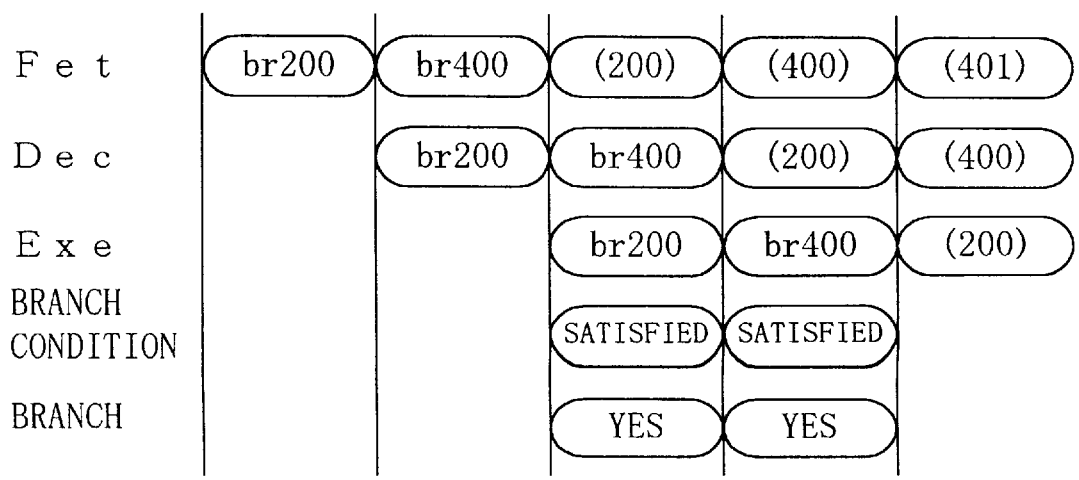
FIG. 12 shows a relationship between the occurrence or nonoccurrence of a branch in each of the delayed branch instruction and instruction execution sequence when the program shown
FIG. 13 shows the flow of pipeline processing when individual branch conditions are satisfied for the consecutive delayed branch instructions during the execution of the program shown in FIG. 11.

FIG. 2 illustrates the operation of the delayed branch control circuit shown in FIG. 1 when the program shown in FIG. 11 is executed by pipeline processing. In FIG. 2, the number of delay slots in the processor is assumed to be 1. As shown in FIG. 2, when a branch condition is satisfied with the delay branch control circuit shown in FIG. 1 in operation, a branch is enabled if branch information stored in the shift register 11 is false, while a branch is disabled if branch information stored in the shift register 11 is true. Accordingly, when the delayed branch instructions are given consecutively and a branch has been caused by the first conditional branch instruction br200, the second conditional branch instruction br400 is constantly unsatisfied.

Figure 3:
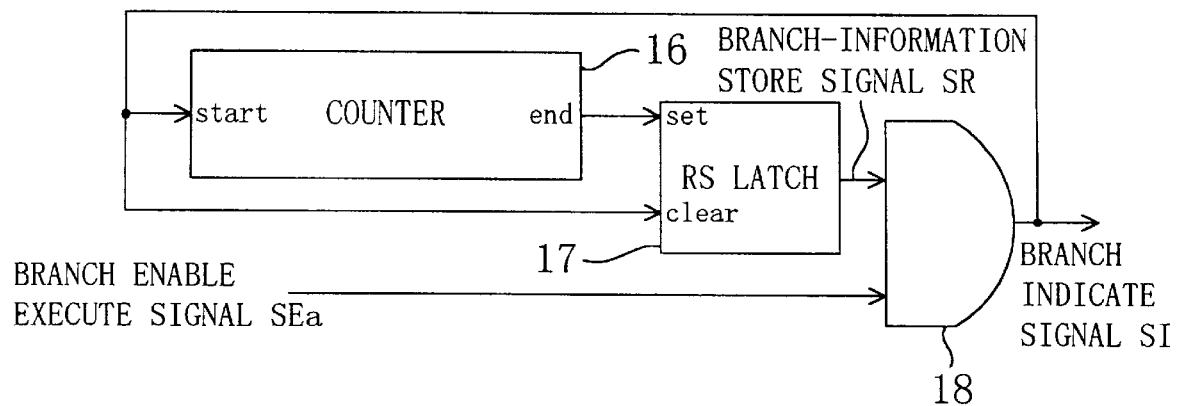
FIG. 3 shows another example of the delayed branch control circuit according to the embodiment of the present invention.

Although the shift register 11 consisting of flip-flops equal in number to delay slots is provided in the delayed branch control circuit shown in FIG. 1 to store branch information for the number of delay slots, a counter 16 and an RS latch 17 may be used instead of the shift register 11, as shown in FIG. 3. In the delayed branch control circuit shown in FIG. 3, the branch-information storing circuit is composed of the counter 16 and the RS latch 17. The branch indicate signal SI clears the RS latch 17, while starting the counting operation of the counter 16. The counter 16 performs a counting operation every time the processor executes an instruction and sets the RS latch 17 when the number of count reaches the number of delay slots. As a result, an output signal from the RS latch 17 is set only when no branch has occurred in the cycles immediately before the current execute cycle which are equal in number to the delay slots. The output signal from the RS latch 17 is inputted as the branch-information store signal SR to the AND gate 18, which controls the outputting of the branch indicate signal SI based on the branch-information store signal SR. In this manner, a branch is disabled during the period after a branch is executed until instruction equal in number to delay slots are executed.

Even when the branch instruction is an unconditional branch instruction in the delayed branch control circuit shown in FIGS. 1 and 3, it is not necessary to take any particular measures if the unconditional branch instruction is considered to be a conditional branch instruction which constantly enables a branch.

It is not necessarily required to store the occurrence or nonoccurrence of a branch in each of the continuous sequence of cycles immediately before the current execute cycle which are equal in number to the delay slots. It is also possible to use the occurrence or nonoccurrence of a branch in part of the continuous sequence of cycles immediately before the current execute cycle which are equal in number to the delay slots as a condition for enabling or disabling a branch. In the delayed branch control circuit shown in FIG. 1, e.g., only output signals from the flip-flops composing the shift register 11 and corresponding to the cycles wherein the occurrence or nonoccurrence of a branch is used as the condition are properly inputted as the branch-information store signal SR to the AND gate 12.

A description will be given next to the principle of conditional-flag rewriting control according to the present invention.

A compare instruction specifies the rewriting of a conditional flag based on the premise that a conditional branch instruction is executed. Consequently, if the rewriting of the conditional flag is disabled during the period after the conditional flag is rewritten by the execution of the compare instruction until the conditional flag is referenced during the execution of the conditional branch instruction, it is possible to determine the satisfaction or unsatisfaction of the condition only with the result of the compare instruction even when an operate instruction normally involving the operation of rewriting the conditional flag is executed between the compare instruction and the branch conditional instruction.

Figures 4A, 4B:
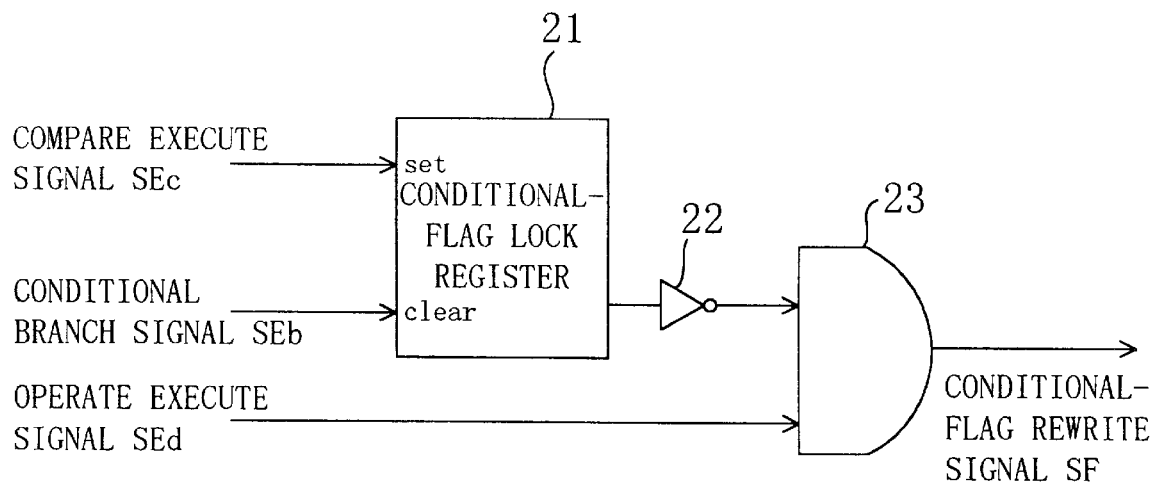
FIG. 4(a) shows the structure thereof and 4(b) illustrates the operation thereof.

FIGS. 4 show a conditional-flag rewriting control circuit implemented based on the principle according to the embodiment of the present invention, of which FIG. 4(*a*) illustrates the structure thereof and FIG. 4(*b*) illustrates the operation thereof. In FIG. 4(*a*) are shown: a conditional-flag lock register 21 as a conditional-flag lock circuit receiving a compare execute signal SEc and a conditional-branch execute signal SEb, which is set by the execution of the compare instruction and cleared by the execution of the conditional branch instruction; an inverting gate 22; and an AND gate 23 as a rewriting judging circuit receiving an operate execute signal SEd and outputting a conditional-flag rewriting control signal SF indicating the rewriting of the conditional flag responsive to an output signal from the conditional-flag lock register 21 during the execution of the operate instruction.

The output signal from the conditional-flag lock register 21 becomes true upon the execution of the compare instruction and becomes false upon the execution of the conditional branch instruction. The output signal from the conditional-flag lock register 21 is inverted by the inverting gate 22 and inputted to the AND gate 23. As a result, when the operate instruction is executed, the conditional-flag rewrite signal SF is outputted from the AND gate 23 only when the output signal from the conditional-flag lock register 21 is false.

Consequently, even when the operate instruction (ADD) is executed during the period between the execution of the compare instruction (CMP) and the execution of the conditional branch instruction (BR), the conditional-flag rewrite signal SF is not outputted since the conditional-flag lock register 21 has been set, as shown in FIG. 4(*b*), and hence the conditional flag is not rewritten.

In the processor performing pipeline processing, an instruction is executed concurrently with the decoding of the subsequent instruction, so that it is possible to recognize the type of the subsequent instruction upon the execution of the current instruction. In view of the foregoing, there can be considered the following two conditional-flag rewriting control methods.

Even when the conditional flag has ben rewritten by the operate instruction, it is useless if the conditional flag is not referenced by the conditional branch instruction. If the subsequent instruction is also for rewriting the conditional flag in the execute cycle for the operate instruction, the rewriting of the conditional flag is obviously useless. In the first method, therefore, the rewriting of the conditional flag is disabled.

Figure 5A:
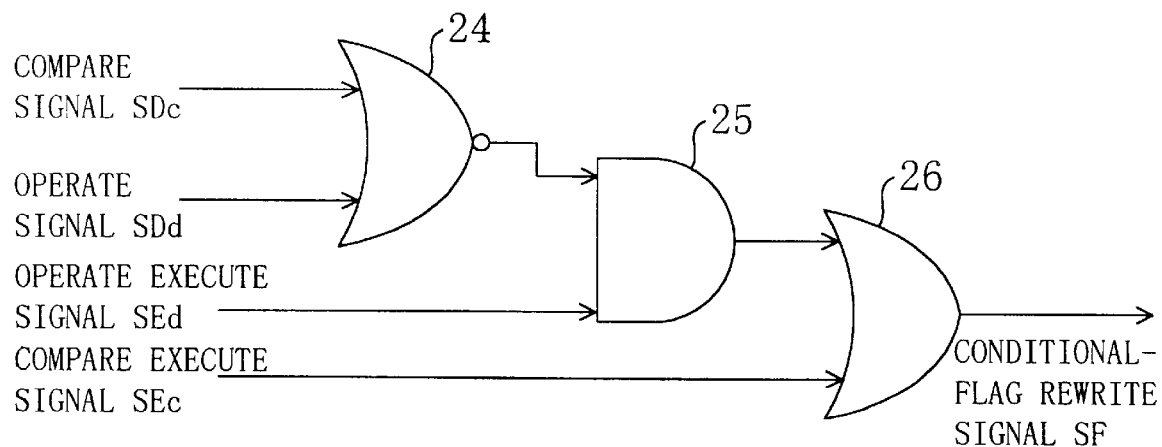
FIG. 5(a) shows the structure thereof an FIG. 5(b) shows the operation thereof.
Figure 5B:
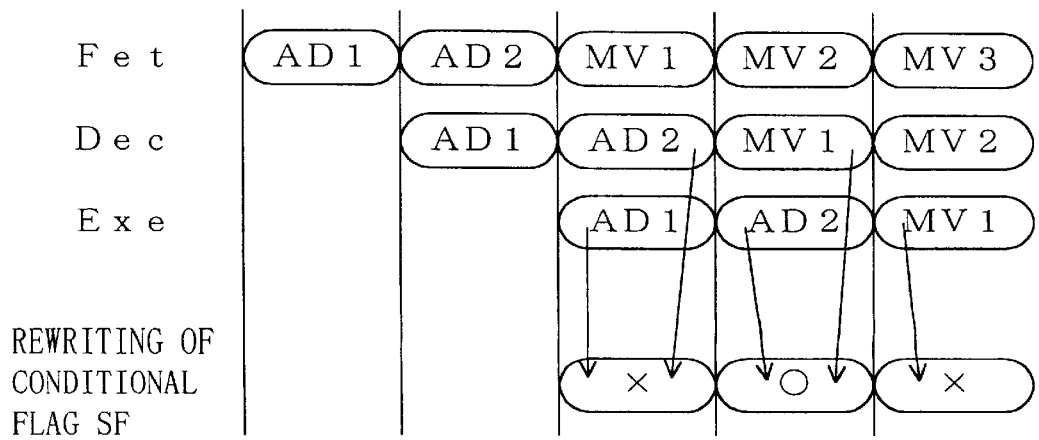

FIGS. 5 show a conditional-flag rewriting control circuit for implementing the first method according to the embodiment of the present invention, of which FIG. 5(a) illustrates the structure thereof and FIG. 5(b) illustrates the operation thereof. In FIG. 5(a), a NOR gate 24 receives a compare signal SDc indicating that the compare instruction is in a decode stage and an operate signal SDd indicating that the operate instruction is in the decode stage and outputs a signal disabling the rewriting of the conditional flag specified by the operate instruction when the compare signal SDc or operate signal SDd is true, i.e., the compare signal SDc or operate signal SDd is in the decode stage. An AND gate 25 receives the operate execute signal SEd indicating that the operate instruction is in an execute stage and produces a true output signal only when the operate execute signal SEd is true, i.e., the operate instruction is in the execute stage and the rewriting of the conditional flag is not disabled by an output signal from the NOR gate 24. An OR gate 26 outputs the conditional-flag rewrite signal SF when an output signal from the AND gate 25 is true. As a result, the conditional-flag rewrite signal SF is outputted only when the instruction to be subsequently executed is not for rewriting the conditional flag in the execute cycle for the operate instruction. The OR gate 26 constantly outputs the conditional-flag rewrite signal SF when the compare execute signal SEc indicating that the compare instruction is in the execute stage is true.

As a result, even when the operate instruction (AD1) is in the execute stage, if the operate instruction (AD2) is in the decode stage, the conditional flag can not be rewritten, as shown in FIG. 5(b).

If the subsequent instruction is a conditional branch instruction in the execute cycle for the operate instruction, the rewriting of the conditional flag is obviously valid. In the second method, therefore, the rewriting of the conditional flag is enabled only when the instruction subsequent to the operate instruction is the conditional branch instruction.

Figure 6A:
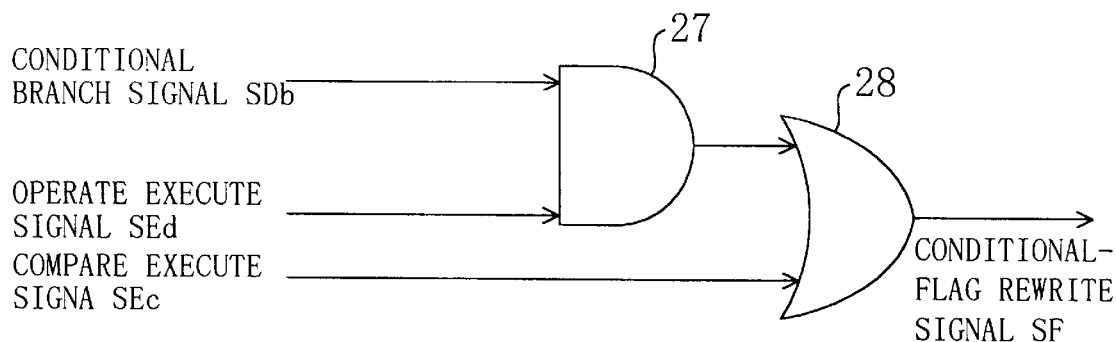
FIG. 6(a) shows the structure thereof and FIG. 6(b) shows the operation thereof.
Figure 6B:
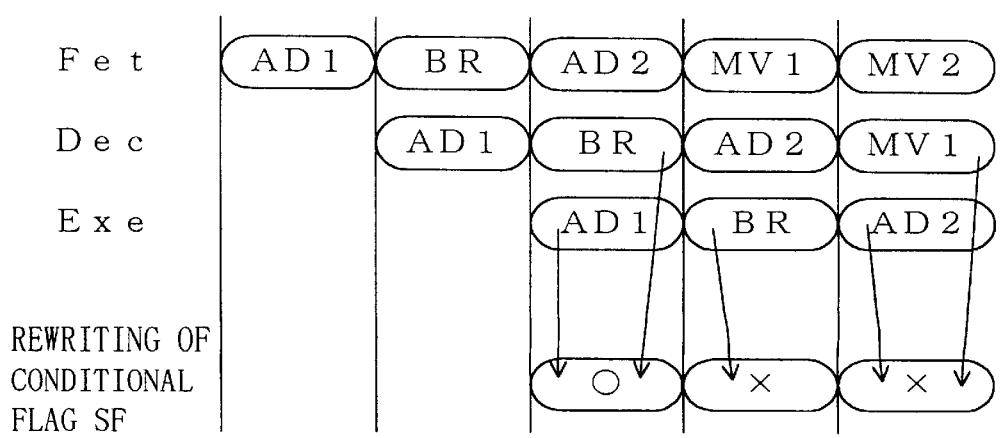

FIGS. 6 show a conditional-flag rewriting control circuit for implementing the second method according to the embodiment of the present invention, of which FIG. 6(a) illustrates the structure thereof and FIG. 6(b) illustrates the operation thereof. In FIG. 6(a), an AND gate 27 receives a conditional branch signal SDb indicating that the conditional branch instruction is in the decode stage and an operate execute signal SEd indicating that the operate instruction is in the execute stage and produces a true output signal when each of the conditional branch signal SDb and the operate execute signal SEd is true, i.e., when the operate instruction is in the execute stage and the conditional branch instruction is in the decode stage. An OR gate 28 outputs the conditional-flag rewrite signal SF when an output signal from the AND gate 27 is true. As a result, the conditional-flag rewrite signal SF is outputted in the execute cycle for the operate instruction only when the instruction to be subsequently executed is a conditional branch instruction. On the other hand, the OR gate 28 constantly outputs the conditional-flag rewrite signal SF when the compare execute signal SEc indicating that the compare instruction is in the execute stage is true.

As a result, the conditional flag is rewritten when the operate instruction (AD1) is in the execute stage and the conditional branch instruction (BR) is in the decode stage and the conditional flag is not rewritten when the operate instruction (AD2) is in the execute stage and the conditional branch instruction is not in the decode stage, as shown in FIG. 6(b).

When the pipeline has an increased number of stages, it is possible to recognize not only the type of the instruction to be subsequently executed but also the types of instructions to be executed thereafter. Hence, it will be appreciated that the rewriting of the conditional flag can be controlled based on the information in accordance with the first or second method.

Figure 7:
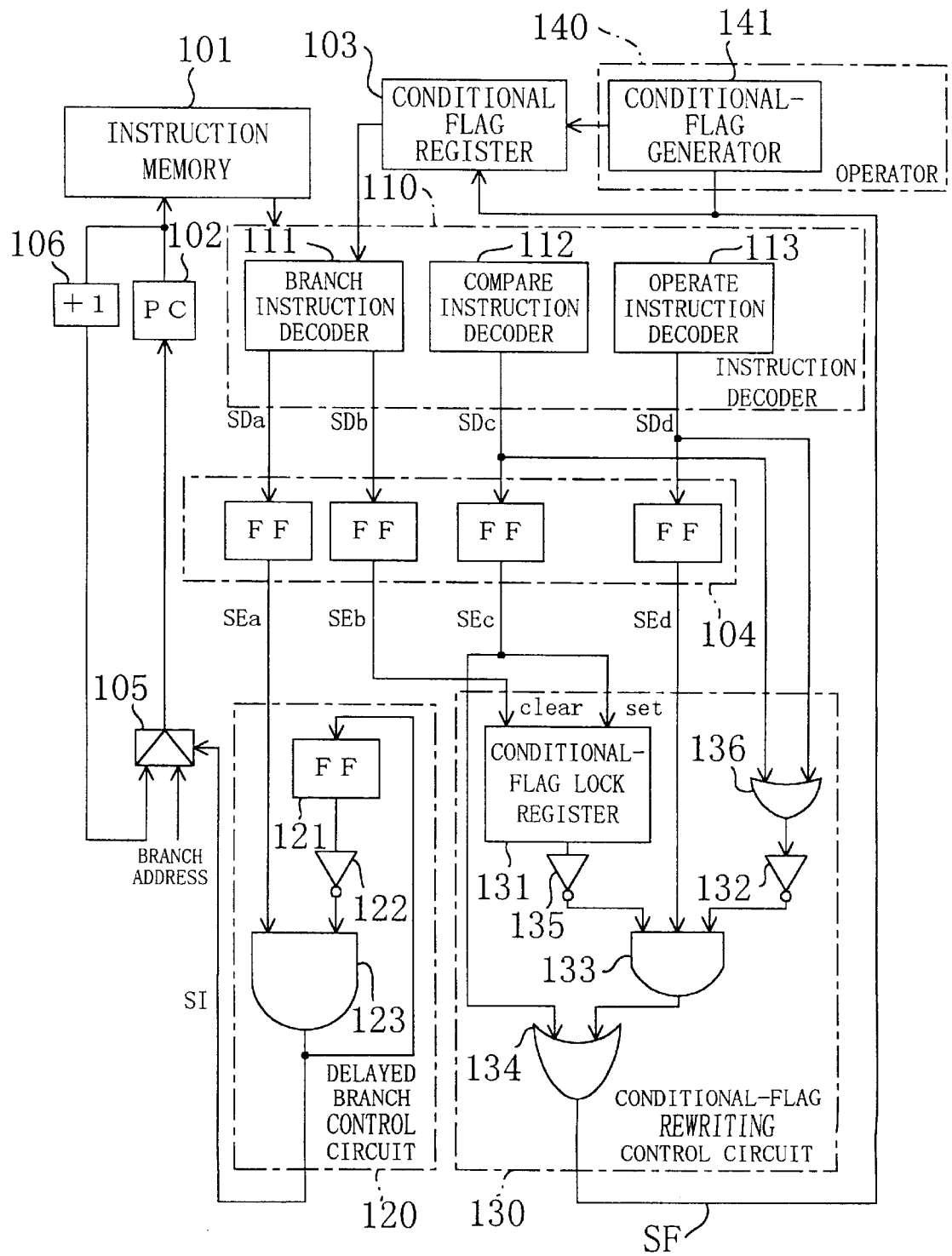
FIG. 7 is a block diagram showing the structure of a processor employing a pipeline processing method, which comprises the delayed branch control circuit and conditional-flag rewriting control circuit according to the embodiment of the present invention.

FIG. 7 is a block diagram showing the structure of a processor performing pipeline processing, which comprises the delayed branch control circuit and conditional-flag rewriting control circuit according to the embodiment of the present invention. In FIG. 7, the portions other than those associated with delayed branch control and conditional-flag rewriting control shown in FIG. 7 are shown in a simplified manner.

In FIG. 7, an instruction memory 101 is a memory for storing an instruction code, which outputs an instruction addressed by a program counter (PC) 102 to an instruction decoder 110. The instruction decoder 110 comprises: a branch instruction decoder 111, a compare instruction decoder 112; and an operate instruction decoder 113. The branch instruction decoder 111 selectively decodes a branch instruction among instructions inputted from the instruction memory 101 and outputs the branch signal SDb, while judging whether or not a branch is enabled by referencing the conditional flag register 103 and outputting a branch enable signal SDa when a branch is enabled. The compare instruction decoder 112 selectively decodes a compare instruction among instructions inputted from the instruction memory 101 and outputs the compare signal SDc. The operate instruction decoder 113 decodes an operate instruction among instructions inputted from the instruction memory 101 and outputs the operate signal SDd. The branch enable signal SDa, branch signal SDb, compare signal SDc, and operate signal SDd are timed by a delay circuit (FF) 104 with the branch enable execute signal SEa, branch execute signal SEd, compare execute signal SEc, and operate execute signal SDd, respectively, which are timing signals in the execute stage.

A delayed branch control circuit 120 has the same structure as the delayed branch control circuit shown in FIG. 1. The delayed branch control circuit 120 consists of a branch-information storing circuit 121 composed of a single flip-flop, an inverting gate 122, and an AND gate 123 and outputs as a branch enable execute signal SEa and an AND signal between the branch enable execute signal SEa and an output signal from the branch-information storing circuit 121. A selector 105 selects an input signal to a PC1O2 responsive to the branch indicate signal SI. The branch indicate signal SI is held by the branch-information storing circuit 121.

A conditional-flag-rewriting control circuit 130 has the same structure as the conditional-flag rewriting circuit shown in FIGS. 4 and 5. A conditional-flag lock register 131, an inverting gate 135, and an AND gate 133 implement the same structure as shown in FIG. 4. An OR gate 136, an inverting gate 132, an AND gate 133, and an OR gate 134 implement the same structure as shown in FIG. 5. The conditional-flag lock register 131 receives the compare execute signal SEc as a set signal and the conditional-branch execute signal SEb as a clear signal and outputs a conditional-flag lock signal. The AND gate 133 implements the AND operation on the inversion signal of the OR between the operation signal SDd and the compare signal SDc generated by the OR gate 136 and the inverting gate 132, respectively, on the inversion signal of the conditional-flag lock signal, and on the operate execute signal SEd so that the OR signal between the logical AND signal and the compare execute signal SEc is outputted as the conditional-flag rewrite signal SF. The conditional-flag rewrite signal SF outputted from the conditional-flag rewriting control circuit 130 controls the operation of a conditional-flag generator 141 in an operator 140 and the updating of the conditional flag register 103.

Figure 8:
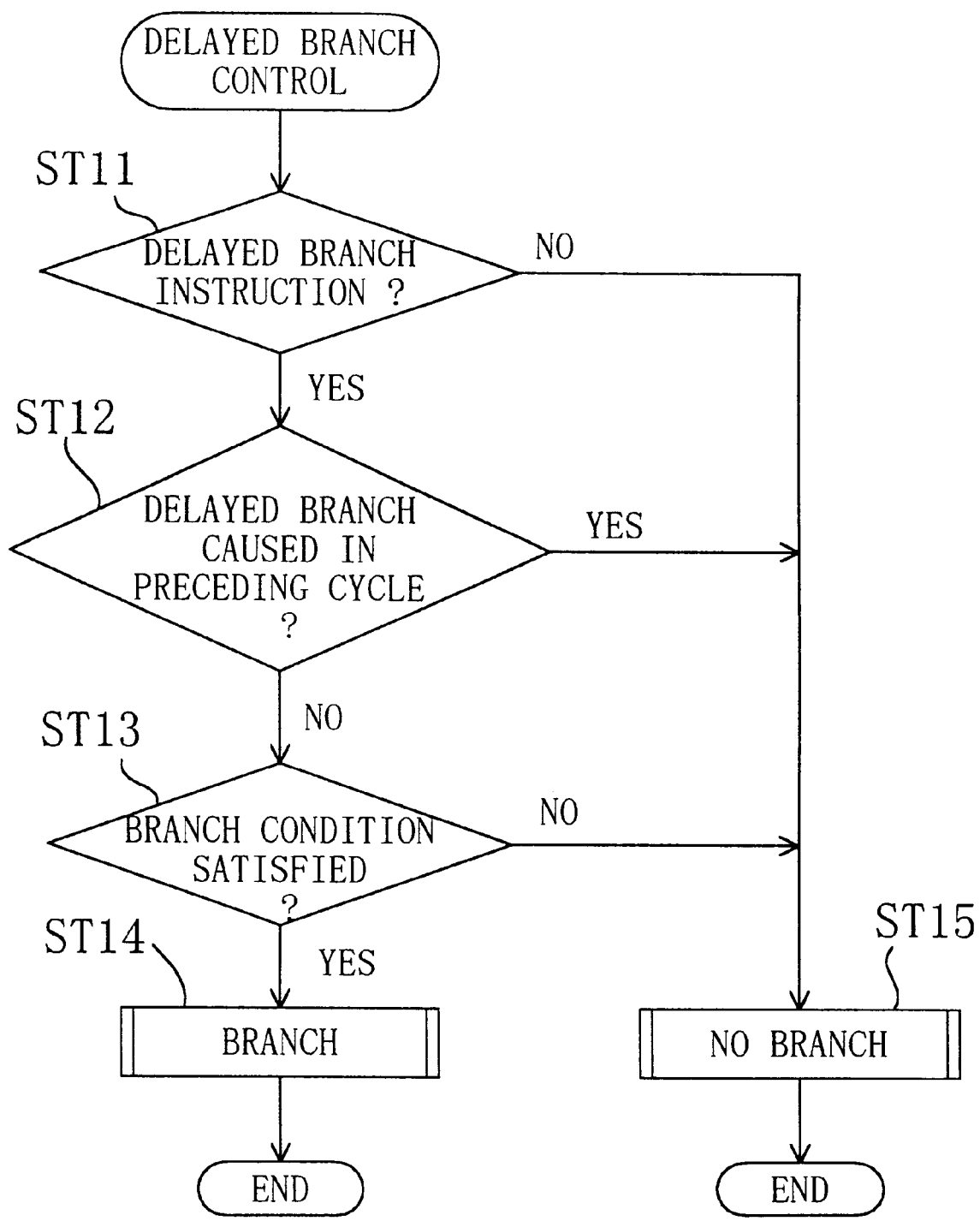
FIG. 8 is a flow chart illustrating the operation of the delayed branch control circuit according to the embodiment of the present invention in the processor shown in FIG. 7.

The operation of delayed branch control according to the embodiment of the present invention in the processor shown in FIG. 7 will be described with reference to the flow chart shown in FIG. 8.

First, in Step ST11, it is judged whether or not the instruction to be executed is a delayed branch instruction. If the instruction to be executed is not a delayed branch instruction, the whole process properly proceeds to Step ST15 with no branch. If the instruction to be executed is a delayed branch instruction, the whole process proceeds to Step ST12 where it is judged whether or not the instruction executed in the immediately preceding cycle is a delayed branch instruction and a branch has occurred. If the instruction executed in the immediately preceding cycle is a delayed branch instruction and a branch has occurred, the whole step proceeds to Step ST15 with no branch. If the instruction executed in the immediately preceding cycle is not a delayed branch instruction, the whole process proceeds to Step ST13 where it is judged whether or not the branch condition is satisfied. If the branch condition is satisfied, the whole process proceeds to Step ST14 with a branch. If the branch condition is not satisfied, the whole process proceeds to Step ST15 with no branch.

In a specific operation of the processor shown in FIG. 7, when delayed branch instructions are given consecutively and the first delayed branch instruction has not caused a branch, the branch indicate signal SI becomes false. Accordingly, an output signal from the inverting circuit 122 connected to the branch-information storing circuit 121 in the delayed branch control circuit 120 becomes true responsive to the subsequent delayed branch instruction, so that the occurrence or nonoccurrence of a branch is determined by the branch enable execute signal SEa. If the first delayed branch instruction has caused a branch, on the other hand, the branch indicate signal SI becomes true so that an output signal from the inverting circuit 122 connected to the branch-information storing circuit 121 in the delayed branch control circuit 120 becomes false responsive to the subsequent delayed branch instruction. Hence, the branch indicate signal SI becomes false irrespective of the branch enable execute signal SEa, which constantly disables a branch. Thus, when the delayed branch instructions are given consecutively, the first delayed branch instruction apparently causes the same operation as caused by an undelayed branch instruction.

Although it is assumed that the number of delay slots in the processor shown in FIG. 7 is 1 and the branch-information storing circuit 121 is composed of a single flip-flop, it will be appreciated that, when the number of delay slots is 2 or more, the shift register 11 consisting of flip-flops which are equal in number to delay slots may be provided instead to use the AND signal between individual output signals from the flop-flops as a disable signal for the branch enable execute signal SEa as shown in FIG. 1 or the counter 16 and RS latch 17 may be provided instead to implement the delayed branch control circuit 120, as shown in FIG. 3.

Figure 9:
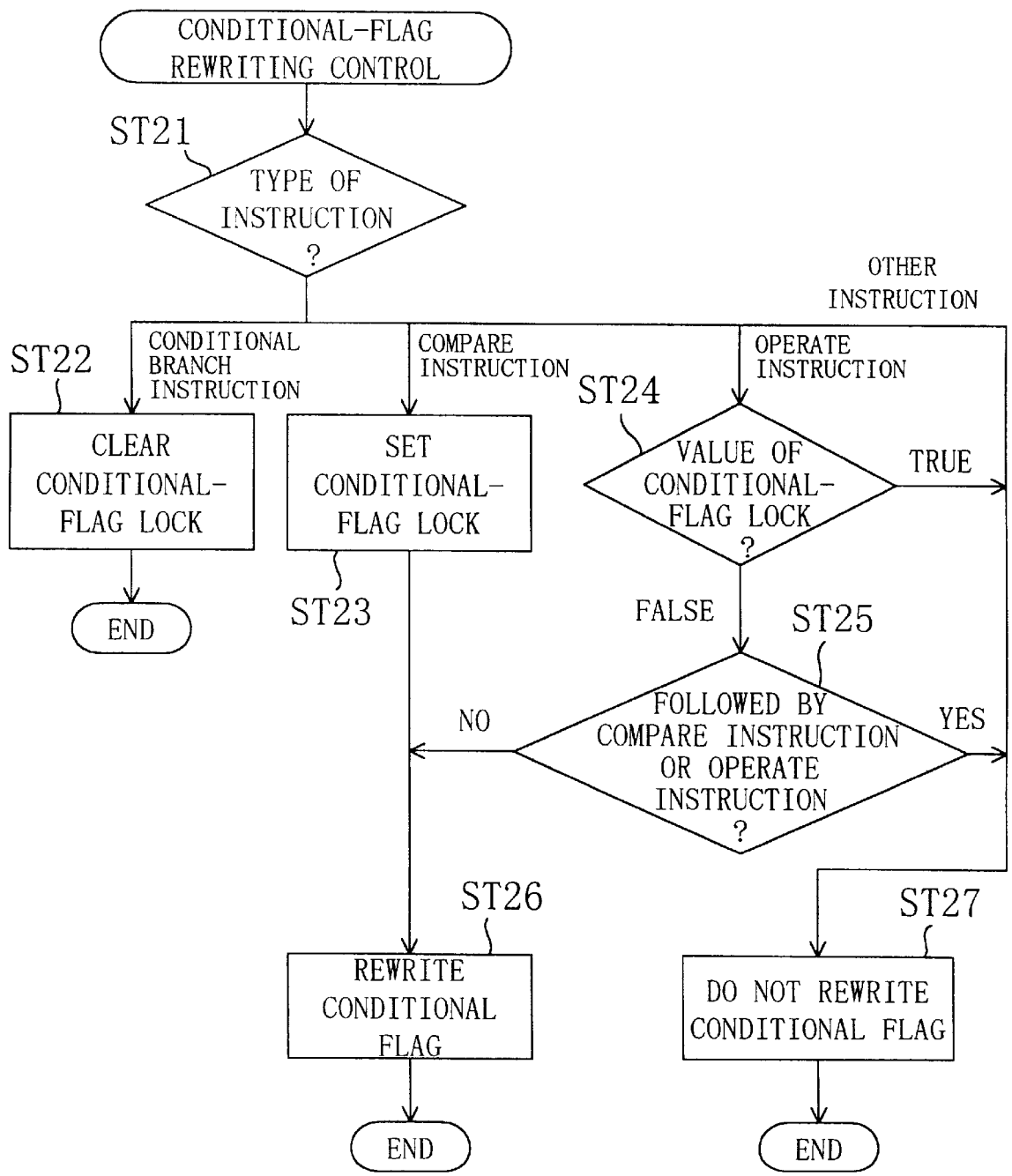
FIG. 9 is a flow chart illustrating the operation of the conditional-flag rewriting control circuit according to the embodiment of the present invention in the processor shown in FIG.7.

The operation of conditional-flag rewriting control according to the embodiment of the present invention in the processor shown in FIG. 7 will be described with reference to the flow chart shown in FIG. 9.

First, in Step ST21, the type of the instruction to be executed is examined. If the instruction to be executed is a conditional branch instruction, the whole process proceeds to Step ST22 where the conditional-flag lock register 131 is cleared. If the instruction to be executed is a compare instruction, the whole process proceeds to Step ST23 where the conditional-flag lock register 131 is set and further proceeds to Step ST26 where the conditional flag is rewritten. If the instruction to be executed is an operate instruction, the whole process proceeds to Step ST24 where it is judged whether an output signal from the conditional-flag lock register 131 is true or false. If the output signal from the conditional-flag lock register 131 is true, the whole process proceeds to Step ST27 and the conditional flag is not rewritten. If the output signal from the conditional-flag lock register 131 is false, on the other hand, the whole process proceeds to Step ST25 where it is judged whether or not the instruction to be executed is an instruction specifying the rewriting of the conditional flag such as an operate instruction or a compare instruction. If the instruction to be executed is an instruction specifying the rewriting of the conditional flag, the whole process proceeds to Step ST27 and the conditional flag is not rewritten. If the instruction to be executed is not an instruction specifying the rewriting of the conditional flag, the whole process proceeds to Step ST26 where the conditional flag is rewritten.

In a specific operation of the processor shown in FIG. 7, when the conditional flag is rewritten by the compare instruction, e.g., the conditional-flag lock register 131 is set by the compare execute signal SEc and the conditional-flag rewrite signal SF remains false until the conditional-flag lock register 131 is cleared by a subsequent instruction specifying a reference to the conditional flag such as a conditional branch instruction, so that the operation of the conditional-flag generator 141 and the updating of the conditional flag register 103 is halted.

When operate instructions are given consecutively, the conditional-flag rewrite signal SF becomes false because the AND gate 133 implements the AND operation on the inversion signal of the operate signal SDd and the operate execute signal SEd, so that the operation of the conditional-flag generator 141 and the updating of the conditional flag register 103 is halted.

As described above, under delayed branch control according to the present embodiment, the program on the assembler level can retain its readability even when delayed branch instructions are given consecutively. Moreover, a circuit implementing the delayed branch control method according to the present embodiment can be implemented by a simple structure. For example, when the number of delay slots in the processor is 1, the circuit can be implemented by a small-scale circuit composed of a single flip-flop with an inverting output and a single AND gate.

On the other hand, under conditional-flag rewrite control according to the present invention, the rewriting of the conditional flag can efficiently be controlled even when the rewrite control bit for the conditional flag is not provided in the instruction code. This facilitates programming on the assembler level and production of a compiler as well as suppresses power consumed by the operation of the conditional-flag generator and the updating of the conditional flag register in the operating unit. Although operate instructions contained in a program normally accounts for 80% of the entire operation cycle, while branch instructions accounts for 20% thereof, the cycle for performing the operation of the conditional flag generator and the updating of the conditional flag register can be reduced from 80% to 20%.

We claim:

1. A method of controlling a branch operation in a processor employing a delayed branch method, said method comprising the steps of:

in executing a branch instruction, judging whether or not a branch has occurred in a specified cycle or cycles before an execute cycle for the branch instruction; and disabling a branch specified by said branch instruction when a branch has occurred in said specified cycle or cycles, and when executing an instruction other than a branch instruction, validating said instruction without judging whether or not a branch has occurred before an execute cycle for said instruction.

2. A method according to claim 1, wherein said specified cycles are continuous cycles equal in number to delay slots in the processor, immediately before the execute cycle for said branch instruction.

3. A delayed branch control circuit provided in a processor employing a delayed branch method to control a branch operation, said circuit comprising:

a branch-information storing circuit for storing information indicating whether or not a branch has occurred in a specified cycle or cycles before a current execute cycle; and a branch judging circuit for directing, in executing a branch instruction, the processor to implement a branch only when a branch condition for the branch instruction is satisfied and said branch-information storing circuit stores information indicating that no branch has occurred in said specified cycle or cycles.

4. A delayed branch control circuit according to claim 3, wherein said specified cycles are continuous cycles equal in number to delay slots in the processor, immediately before the execute cycle for said branch instruction.

5. A delayed branch control circuit according to claim 4, wherein said branch-information storing circuit comprises a shift register composed of flip-flops connected in series which are equal in number to said delay slots in the processor, said shift register receiving an output signal from said branch judging circuit and shifting a signal held thereby every time an instruction is executed in said processor.

6. A delayed branch control circuit according to claim 4, wherein said branch-information storing circuit comprises:

a counter for initiating counting of the number of instructions executed by said processor when said branch judging circuit directs the processor to implement a branch and completing the counting when the number of count reaches the number of said delay slots in the processor; and a latch circuit for clearing an output signal therefrom when said branch judging circuit directs the processor to implement a branch and setting the output signal when said counter completes the counting.

* * * * *

UNITED STATES PATENT AND TRADEMARK OFFICE
CERTIFICATE OF CORRECTION

PATENT NO. : 5,996,069
DATED : November 30, 1999
INVENTOR(S) : Yasoshima et al.

It is certified that error appears in the above-identified patent and that said Letters Patent is hereby corrected as shown below:

On the Cover Page:

In the Other Publications section, before first listed reference, insert --SunMicrosystems, Inc., "SPARK Architecture Manual," The SPARC Architecture Manual, Version 8, 30 January 1991, pp. 43-48--.

Signed and Sealed this

Twelfth Day of December, 2000

*Attest:*

Q. TODD DICKINSON

*Attesting Officer*     *Director of Patents and Trademarks*